United States Patent [19]

Han et al.

[11] Patent Number: 4,689,372
[45] Date of Patent: Aug. 25, 1987

[54] CARBODIIMIDE-FUNCTIONALIZED POLYPHENYLENE ETHER AND METHOD OF PREPARATION

[75] Inventors: Choong Y. Han, Schenectady; William L. Gately, Burnt Hills, both of N.Y.

[73] Assignee: General Electric Company, Schenectady, N.Y.

[21] Appl. No.: 866,645

[22] Filed: May 27, 1986

[51] Int. Cl.$^4$ .............................................. C08G 65/48
[52] U.S. Cl. .................................. 525/390; 525/391; 525/397
[58] Field of Search ....................... 525/390, 391, 397

[56] References Cited

U.S. PATENT DOCUMENTS 3,375,228  3/1968  Holoch et al. ...................... 525/397
3,652,710  3/1972  Holob et al. ....................... 525/397
4,048,143  9/1977  Hay et al. .......................... 525/390

FOREIGN PATENT DOCUMENTS 747325  9/1970  Belgium ............................. 525/390

Primary Examiner—Harold D. Anderson
Attorney, Agent, or Firm—William H. Pittman; James C. Davis, Jr.; James Magee, Jr.

[57] ABSTRACT

Carbodiimide-functionalized polyphenylene ethers, which may be prepared by the reaction of various acid-functionalized polyphenylene ethers with polycarbodiimides, are useful in the preparation of polyphenylene ether copolymers. These copolymers are, in turn, useful for the compatibilization of blends of polyphenylene ethers with such other polymers as polyesters and polyamides.

11 Claims, No Drawings

CARBODIIMIDE-FUNCTIONALIZED POLYPHENYLENE ETHER AND METHOD OF PREPARATION

This invention relates to functionalized polyphenylene ethers and their preparation and use.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are polyamides and linear polyesters, including poly(alkylene dicarboxylates). However, such blends frequently undergo phase separation and delamination. They typically contain large, incompletely dispersed polyphenylene ether particles and no phase interaction between the two resin phases. Molded parts made from such blends are typically characterized by extremely low impact strength.

A principal object of the present invention, therefore, is to prepare novel polyphenylene ether compositions.

A further object is to prepare functionalized polyphenylene ethers which are capable of compatibilizing blends of polyphenylene ethers with such polymers as polyamides and linear polyesters.

Other objects will in part be obvious and will in part appear hereinafter.

In one of its aspects, the present invention is directed to carbodiimide-functionalized polyphenylene ethers, particularly those containing at least one moiety having the formula

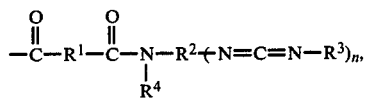

wherein:

$R^1$ is a divalent hydrocarbon or substituted hydrocarbon radical, $R^2$ is a divalent or trivalent hydrocarbon or substituted hydrocarbon radical or a carbodiimide polymer radical, $R^3$ is a hydrocarbon or substituted hydrocarbon radical, $R^4$ is H or

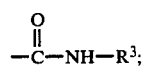

and
n is 1 or 2.

The polyphenylene ethers (also known as polyphenylene oxides) used in this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

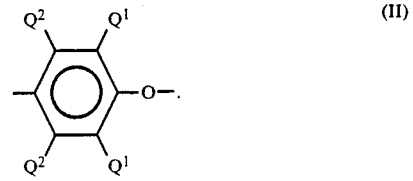

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2, 6-dimethyl-1, 4-phenylene ether units. Suitable copolymers include random copolymers containing such units in combination with (for example) 2, 3, 5-trimethyl-1, 4-phenylens ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl/g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly (2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purpose of this invention are those which comprise molecules having at least one of the end groups of the formulas

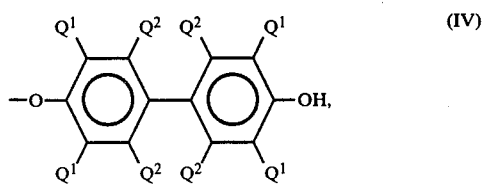

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$primary alkyl radical. Preferably, each $R^1$ is hydrogen and each $R^2$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

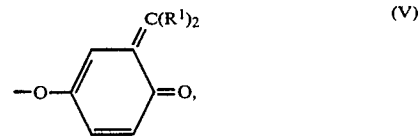

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

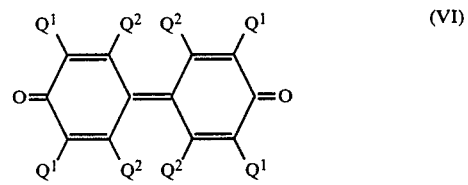

is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The polyphenylene ether is linked to the structure shown in formula I. The $R^1$ values in that formula are divalent hydrocarbon or substituted hydrocarbon radicals which may be aliphatic, alicyclic or aromatic and are usually aromatic. They may be hydrocarbon radicals or substituted hydrocarbon radicals wherein the substituents do not undergo interfering reactions in the context of the invention. Suitable substituents include halo, nitro, alkoxy, carbalkoxy and the like. Particularly preferred are hydrocarbon and carbalkoxy-substituted hydrocarbon radicals.

The $R^2$ values may be divalent ($n=1$) or trivalent ($n=2$) radicals similar to those described for $R^1$. They are usually aromatic or mixed aromatic-aliphatic, the latter being illustrated by bis(phenylene) alkane radicals and the like.

Alternatively, the $R^2$ values may be carbodiimide polymer radicals; that is, they may be derived from carbodimide polymers of the type disclosed, for example, in Alberino et al., *J. Appl. Poly. Sci.*, 21, 1999 (1977). Such radicals typically have the formula

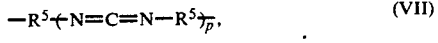

wherein $R^5$ is a divalent hydrocarbon or substituted hydrocarbon radical similar to those described hereinabove with respect to $R^2$ and p is from 1 to about 20, preferably from 1 to 5.

The $R^3$ values are hydrocarbon or substituted hydrocarbon radicals, generally containing about 4-10 carbon atoms. Alkyl or cycloalkyl radicals, such as t-butyl, isooctyl and cyclohexyl, are preferred.

Depending on various factors such as the reaction conditions prevailing during the formation of the carbodiimide-functionalized polyphenylene ether, $R^4$ may be hydrogen or a radical of the formula

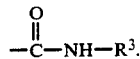

The latter radicals are formed by the normal reaction of a carbodiimide with a carboxylic acid. Under certain conditions, however, they may eliminate the elements of an isocyanate to yield a compound in which at least one $R^4$ is H.

The moieties of formula I may be linked to the polyphenylene ether in various ways, depending on reactants and conditions as described hereinafter. For example, reactions involving the use of such compounds as terephthaloyl chloride or trimellitic anhydride acid chloride will result in a bond with one or both terminal oxygen atoms of the polyphenylene ether. The compositions thus obtained, which are often preferred for the purposes of the invention, may be represented by the formula

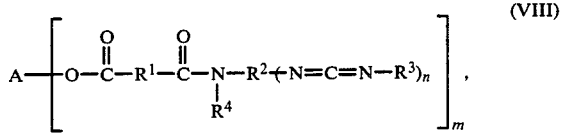

wherein A is a polyphenylene ether moiety, m is 1 or 2 and $R^{1-4}$ and n are as previously defined.

Maleic anhydride and fumaric acid, on the other hand, are believed to react with polyphenylene ethers via grafting on the $Q^1$ groups or the aromatic rings, forming at least one carbon-carbon bond with said groups or with other similar grafted moieties attached thereto. In general, an average of about 1-5 moieties of formula I are then present per polyphenylene ether molecule.

The carbodiimide-functionalized polyphenylene ethers of this invention may be prepared by the reaction of an acid-functionalized polyphenylene ether with a polycarbodiimide. Polycarbodiimides are prepared by methods known in the art, typically the reaction of a diisocyanate with an amine to form a bisurea which is then dehydrated, or the condensation of one or more diisocyanates in the presence of a catalyst. The latter method is particularly useful for the preparation of carbodiimide polymers.

The term "acid-functionalized polyphenylene ether", as used herein, generically denotes the reaction product of a polyphenylene ether with any of various carboxylic acids or functional derivatives thereof, including salts, esters, anhydrides, amides and imides. One method of preparing acid-functionalized polyphenylene ethers is by reaction of the polymer with at least one compound containing (a) a carbon-carbon double or triple bond, hydroxy group, alkoxy group, aryloxy group or acyl halide group, and also (b) a carboxylic acid, acid salt, acid anhydride, acid amide, acid ester or imido group. A wide variety of such compounds are suitable for this purpose. Many illustrative compounds are listed in U.S. Pat. No. 4,315,086, the disclosure of which is incorporated by reference herein. They include maleic, fumaric, itaconic and citraconic acids and their derivatives, various unsaturated fatty oils and the acids derived therefrom, relatively low molecular weight olefinic acids such as acrylic acid and its homologs, and the like.

Another class of acid-functionalized polyphenylene ethers is disclosed in copending, commonly owned application Ser. No. 780,151, filed Sept. 26, 1985, the disclosure of which is also incorporated by reference herein. The compositions in this class are prepared by reaction of the polyphenylene ether with a compound of the formula

wherein $R^6$ is an aromatic or saturated aliphatic radical, $X^1$ is halogen (especially chlorine) and $X^2$ is one or two carboxylic acid, acid salt, acid amide or acid ester groups or a dicarboxylic acid anhydride or imide group. Illustrative compounds of this type are carboxymethylsuccinic anhydride acid chloride and trimellitic anhydride acid chloride (TAAC).

Particularly preferred functionalizing agents are maleic acid and its derivatives (especially maleic anhydride), fumaric acid and trimellitic anhydride acid chloride.

These functionalizing agents may be reacted with the polyphenylene ether by heating a mixture thereof, typically at a temperature within the range of about 80°-390° C., in solution or in the melt and preferably the latter. In general, about 0.01-2.0, most often about 0.3-1.0 and preferably about 0.5-1.0 parts (by weight) of said functionalizing agent is employed per 100 parts of polyphenylene ether. The reaction may conveniently be carried out in an extruder or similar equipment.

The acid-functionalized polyphenylene ether is converted into a carbonimide-functionalized polyphenylene ether by reaction with a polycarbodiimide. The latter may be a bis- or tris-carbodiimide or a carbodiimide polymer of the type described in the aforementioned Alberino et al. paper.

The reaction typically takes place at temperatures in the range of about 100°-200° C., preferably about 100°-125° C. The proportion of carbodiimide is generally about 5-25 and preferably about 10-20 parts by weight per 100 parts of acid-functionalized polyphenylene ether. The reaction is generally conveniently conducted in a solvent, suitable solvents being aromatic hydrocarbons such as toluene and xylene, chlorinated aromatic hydrocarbons such as chlorobenzene, and compounds having solvent properties similar thereto.

The preparation of the carbodiimide-functionalized polyphenylene ethers of this invention is illustrated by the following examples. The polyphenylene ether used in each example was an unfunctionalized poly-(2,6-dimethyl-1,4-phenylene ether) having a number average molecular weight of about 20,000, an intrinsic viscosity (IV) in chloroform at 25° C. of 0.48 dl./g. and 0.084% (by weight) hydroxy groups.

EXAMPLE 1

A solution of 100 parts of polyphenylene ether, 2 parts of TAAC and 5 parts of dimethyl-n-butylamine in 500 parts of toluene was heated at 95° C. for 3 hours, with stirring. The product was precipitated by addition of methanol, redissolved in toluene and reprecipitated, and dried under reduced pressure to yield the desired acid-functionalized polyphenylene ether. Its structure was confirmed by infrared spectroscopy.

Cyclohexylamine, 8.64 grams (87 mmol.), was added dropwise under nitrogen, with stirring, to a solution of 10 grams (26.2 mmol.) of 1-isocyanato-2,4-bis(4-isocyanatophenylmethyl) benzene in 200 ml. of dry toluene. The mixture was heated for 1 hour at 80° C., with stirring, and cooled to room temperature. The precipitated solid was filtered, washed with toluene and dried. Based on method of preparation, it was a tris-urea of the formula

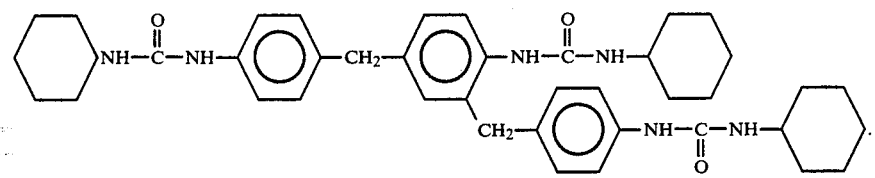

To a mixture of 4 grams of the tris-urea in 12 ml. of dry pyridine was added portionwise 6 grams of p-toluene-sulfonyl chloride. The mixture was heated under nitrogen at 70° C. for 1 hour and poured into 30 ml. of ice water, with vigorous stirring. Ethyl acetate, 40 ml., was added and the mixture was stirred for 10 minutes. The aqueous layer was removed and the organic layer was washed with aqueous sodium carbonate solution and vacuum stripped. The residue was extracted twice with petroleum ether to yield the desired 1-cyclohexylcarbodiimido-2,4-bis(4-cyclohexylcarbodiimidophenylmethyl) benzene.

To a solution of 500 grams of the acid-functionalized polyphenylene ether in 3.2 liters of dry toluene was added under nitrogen, with stirring, a solution of 58 grams of the tris-carbodiimide prepared as described above. The mixture was heated under reflux for 4 hours in a nitrogen atmosphere, cooled and poured into a large excess of acetone. The desired carbodiimide-functionalized polyphenylene ether was filtered, washed with acetone and dried.

EXAMPLE 2

A mixture of 99 parts of polyphenylene ether and 1 part of maleic anhydride was extruded on a single-screw extruder at temperatures in the range of 120°–330° C. The extrudate, comprising the desired maleic anhydride-functionalized polyphenylene ether, was quenched in water, pelletized, dissolved in chloroform, precipitated with methanol, filtered and vacuum dried at 60° C.

Following substantially the procedure of Example 1, the maleic anhydride-functionalized polyphenylene ether was reacted with the tris-carbodiimide. The product was the desired carbodiimide-functionalized polyphenylene ether.

EXAMPLES 3–9

Following the procedure of Example 1, the acid-functionalized polyphenylene ethers of Examples 1 and 2 were reacted with various polycarbodiimides. The identities of the reactants are listed in Table I.

TABLE I

| Example | Acid-functionalized polyphenylene ether | Carbodiimide |
| --- | --- | --- |
| 3 | Ex. 1 | 4,4'-Bis(4-cyclohexylcarbodiimido)diphenylmethane |
| 4 | Ex. 2 | 4,4'-Bis(4-cyclohexylcarbodiimido)diphenylmethane |
| 5 | Ex. 1 | 1-t-Butylcarbodiimide-2,4-bis-(4-t-butylcarbodiimidophenylmethyl)benzene |
| 6 | Ex. 2 | 1-t-Butylcarbodiimido-2,4-bis-(4-t-butylcarbodiimidophenylmethyl)benzene |
| 7 | Ex. 2 | 4,4'-Bis(4-t-butylcarbodiimido)diphenylmethane |
| 8 | Ex. 1 | Phenyl-terminated 4,4'-diphenylmethanecarbodiimide oligomer, degree of polymerization 3–4 |
| 9 | Ex. 2 | Phenyl-terminated 4,4'-diphenylmethanecarbodiimide oligomer, degree of polymerization 3–4 |

As previously indicated, the carbodiimide-functionalized polyphenylene ethers of this invention are useful in the preparation of compatibilized blends of polyphenylene ethers with such polymers as polyamides and linear polyesters. In particular, the carbodiimide-functionalized polyphenylene ethers form copolymers with linear polyesters, which are themselves compatible and which may also be used for compatibilization of polyphenylene ether-linear polyester blends. Compositions comprising such polyphenylene ether-polyester copolymers are disclosed and claimed in copending, commonly owned application Ser. No. 866,661.

Among the linear polyesters which are useful in preparing copolymers with the carbodiimide-functionalized polyphenylene ethers are the poly(alkylene dicarboxylates). They typically comprise at least 30 and most often at least 50 structural units, usually of the formula

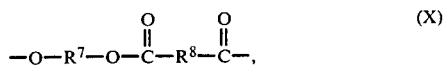

wherein $R^7$ is a divalent aliphatic or alicyclic radical containing about 2–10 carbon atoms and $R^8$ is a divalent aliphatic, alicyclic or aromatic radical containing about 2–10 and usually about 6–10 carbon atoms.

Such polyesters are typically prepared by the known reaction of dihydroxy compounds with dicarboxylic acids or functional derivatives thereof such as anhydrides, acid chlorides or lower alkyl (especially methyl) esters, preferably the esters.

The $R^7$ radicals may be one or more aliphatic or alicyclic hydrocarbon radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol and 2-butene-1,4-diol. They may also be radicals containing substituents which do not substantially alter the reactivity of the dihydroxy compound (e.g., alkoxy, halo, nitrile) or hetero atoms (e.g., oxygen or sulfur). The $R^7$ radicals are usually saturated.

The $R^8$ radicals may be derived from such acids as succinic, adipic, maleic, isophthalic and terephthalic acids or similar substituted and hetero atom-containing acids.

Most often, $R^7$ and $R^8$ are hydrocarbon radicals, typically containing about 2–10 carbon atoms. Preferably, $R^7$ is aliphatic and $R^8$ is aromatic. The polyester is most desirable a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents:

U.S. Pat. No. 2,465,319
U.S. Pat. No. 2,720,502
U.S. Pat. No. 2,727,881
U.S. Pat. No. 2,822,348
U.S. Pat. No. 3,047,539
U.S. Pat. No. 3,671,487
U.S. Pat. No. 3,953,394
U.S. Pat. No. 4,128,526.

The polyesters most often have number average molecular weights in the range of about 10,000–70,000, as determined by intrinsic viscosity (IV) at 30° C. in a mixture of 60% (by weight) phenol and 40% 1,1,2,2-tetrachloroethane.

It is also contemplated to employ elastomeric polyesters. Such polyesters are known in the art; they are exemplified by compositions in which a portion of the $R^6$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

To prepare the copolymers, the carbodiimide-functionalized polyphenylene ether and polyester are heated together in solution or in the melt. The reaction temperature is typically within the range of about 100°–300° and preferably about 150°–290° C. The proportions of carbodiimide-functionalized polyphenylene ether and polyester are not critical and may be adjusted over a wide range to yield copolymer compositions having the desired properties.

In general, the copolymer compositions comprise only partially copolymer, with the balance being a polyphenylene ether-polyester blend. The approximate proportion of copolymer in the composition may often be conveniently expressed as the percentage of copolymerized polyphenylene ether based on total polyester. It may be determined by extracting unreacted polyphenylene ether with a suitable solvent, typically toluene, and analyzing the insoluble residue (copolymer and residual polyester) by proton nuclear magnetic resonance.

It is frequently preferred to maximize the proportion of carboxy end groups in the polyester. This may frequently be accomplished by preextruding the polyester, typically at a temperature in the range of about 250°–300° C. Under these conditions, there is apparently a loss by degradation and volatilization of hydroxy end group functionality, producing a polymer with a high proportion of carboxy end groups.

The preparation of polyphenylene ether-polyester copolymer compositions of this invention is illustrated by the following examples.

EXAMPLE 10

A poly(butylene terephthalate) having a number average molecular weight of about 40,000 and a carboxy end group concentration of 24.7 microequivalents per gram was preextruded on a twin-screw extruder at about 260° C., whereupon the carboxylate end group concentration was increased to 34.3 microequivalents per gram.

A solution of 150 grams of the preextruded polyester in 2.25 liters of 1,2,4-trichlorobenzene was heated to 200° C. under nitrogen, and 150 grams of the carbodiimide-functionalized polyphenylene ether of Example 1 was added. Heating was continued for 2 hours at 190° C. The solution was then poured into acetone and the precipitated copolymer composition filtered and extracted with acetone. Analysis showed the presence of 61% copolymerized polyphenylene ether.

EXAMPLES 11–18

Following the procedure of Example 10, copolymers were prepared from the carbodiimide-functionalized polyphenylene ethers of Examples 2–9. The results are given in Table II.

TABLE II

| Example | Carbodiimide-functionalized polyphenylene ether | % copolymerized polyphenylene ether |
|---|---|---|
| 11 | 2 | 55 |
| 12 | 3 | 35 |
| 13 | 4 | 44 |
| 14 | 5 | 41 |
| 15 | 6 | 52 |
| 16 | 7 | 46 |
| 17 | 8 | 16 |
| 18 | 9 | 13 |

As previously mentioned, the above-described copolymer compositions, and polyphenylene ether-poly(alkylene dicarboxylate) blends in which they are incorporated, have high impact strength, good solvent resistance and other advantageous properties. These properties make them useful for the preparation of molded and extruded articles.

The weight ratio of polyester to total polyphenylene ether in the copolymer-containing blend is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 10–80% by weight of total resinous components.

The blends may also contain ingredients other than the copolymer, polyphenylene ether and polyester. A particularly useful other ingredient in many instances is at least one elastomeric impact modifier which is compatible with the polyphenylene ether. It is generally present in the amount of about 5–25% by weight of resinous components.

Suitable impact modifiers include various elastomeric copolymers, of which examples are ethylene-propylenediene polymers (EPDM's), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly (alkyl acrylate) core attached to a polystyrene shell via an interpenetrating network. Such core-shell elastomers are more fully disclosed in copending, commonly owned application Ser. No. 811,800, filed Dec. 20, 1985.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing blends include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The preparation of copolymer-containing blends is normally achieved under conditions adapted for the formation of an intimate resin blend. Such conditions often include extrusion, typically at temperatures in the range of about 100°–300° C. and otherwise under the conditions previously described. Extrusion may be conveniently effected in a screw-type or similar extruder which applies a substantial shearing force to the composition, thereby decreasing the particle size thereof. It is sometimes found that the impact strength of the composition is increased if it is extruded more than once, thereby insuring effective blending.

The preparation and properties of such blends are illustrated by the following examples.

EXAMPLES 19–22

Resin blends were prepared by extrusion under conventional conditions in a twin-screw extruder. The impact modifier ("SEBS") in each blend was a commercially available triblock copolymer in which the polystyrene end blocks have weight average molecular weights of 29,000 and the ethylene/butylene midblock has a weight average molecular weight of 116,000.

The relevant proportions and parameters are given in Table III. All ingredient percentages are by weight. Polyesters are identified as "PET" (polyethylene terephthalate) or "PBT" (polybutylene terephthalate) and by number average molecular weight. Tensile strength and modulus values are in pascals $\times 10^{-7}$.

TABLE III

| | Example | | | |
|---|---|---|---|---|
| | 19 | 20 | 21 | 22 |
| Product of Example 10, % | 64.4 | — | — | — |
| Polyphenylene ether, %: | | | | |
| Example 1 | 12.75 | 45 | 45 | — |
| Example 4 | — | — | — | 45 |
| Polyester, %: | | | | |
| PBT, 50,000 | 12.75 | 45 | — | 45 |
| PET, 45,000 | — | — | 45 | — |
| Impact modifier: SEBS, % | 10.1 | 10 | 10 | 10 |
| Izod impact strength (notched), joules/m. | 630 | 625 | 673 | 774 |
| Tensile strength at yield | 4.78 | 4.39 | — | — |
| Tensile strength at break | 4.57 | 4.41 | — | — |
| Elongation at break, % | 77 | 81 | — | — |
| Tensile modulus | 56.2 | 37.6 | — | — |

We claim:

1. A carbodiimide-functionalized polyphenylene ether composition comprising a plurality of structural units having the formula

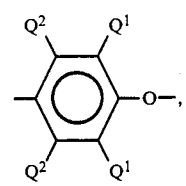

(II)

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$; and containing at least one moiety having the formula

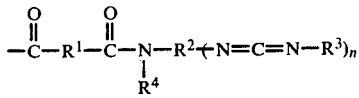 (I)

bound to terminal oxygen atoms or to $Q^1$ groups, wherein:
  $R^1$ is a divalent hydrocarbon or substituted hydrocarbon radical,
  $R^2$ is a divalent or trivalent hydrocarbon or substituted hydrocarbon radical or a carbodiimide polymer radical,
  $R^3$ is a hydrocarbon or substituted hydrocarbon radical,
  $R^4$ is H or

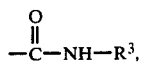

and
n is 1 or 2.

2. A composition according to claim 1 wherein an average of about 1–5 moieties of formula I are present per polyphenylene ether molecule.

3. A composition according to claim 1 wherein $R^1$ is aromatic and $R^2$ is aromatic or mixed aromatic-aliphatic.

4. A composition according to claim 3 wherein $R^1$ is a hydrocarbon or carbalkoxy-substituted hydrocarbon radical.

5. A composition according to claim 4 wherein the polyphenylene ether is a poly(2,6-dimethyl-1,4-phenylene ether).

6. A composition according to claim 5 wherein $R^3$ is an alkyl or cycloalkyl radical containing about 4–10 carbon atoms.

7. A composition according to claim 1 wherein $R^1$ is aromatic and $R^2$ is a carbodiimide polymer radical having the formula

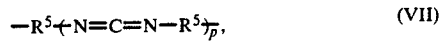 (VII)

wherein $R^5$ is a divalent hydrocarbon or substituted hydrocarbon radical and p is from 1 to about 20.

8. A composition according to claim 7 wherein $R^5$ is aromatic or mixed aromatic-aliphatic.

9. A composition according to claim 8 wherein $R^1$ is a hydrocarbon or carbalkoxy-substituted hydrocarbon radical.

10. A composition according to claim 9 wherein the polyphenylene ether is a poly(2,6-dimethyl-1,4-phenylene ether).

11. A composition according to claim 10 wherein $R^3$ is an alkyl or cycloalkyl radical containing about 4–10 carbon atoms.

12. A composition according to claim 15 having the formula

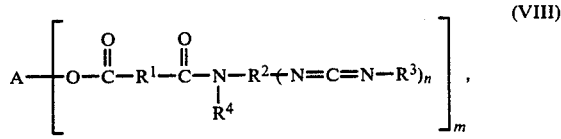 (VIII)

wherein A is a polyphenylene ether moiety and m is 1 or 2.

* * * * *